United States Patent [19]
Demorest

[11] Patent Number: 5,377,852
[45] Date of Patent: Jan. 3, 1995

[54] CALF SUCKER BOTTLE HOLDER

[76] Inventor: Robert E. Demorest, 18434 U.S. 20, Bellevue, Id. 83313

[21] Appl. No.: 24,672

[22] Filed: Mar. 1, 1993

[51] Int. Cl.$^6$ ............................................. A61J 9/00
[52] U.S. Cl. .................................... 215/11.1; 119/72; 229/122.2; 229/161
[58] Field of Search ............... 215/11.1, 11.3, 1 C; 229/1.5 H, 122.2, 183, 161; 248/102, 103; 119/18, 77, 72, 72.5, 71; 222/105

[56] References Cited

U.S. PATENT DOCUMENTS

| | | | |
|---|---|---|---|
| 3,049,258 | 8/1962 | Fullum | 215/11.1 |
| 3,777,925 | 12/1973 | Eckholm | 215/11.3 |
| 3,784,039 | 1/1974 | Marco | 215/11.3 |
| 4,535,928 | 8/1985 | Capo | 229/197 X |
| 4,558,815 | 12/1985 | Wischusen, III | 229/112 |
| 4,821,896 | 4/1989 | Cheng | 215/11.3 |
| 4,890,789 | 1/1990 | LoDuca | 229/183 X |
| 4,979,629 | 12/1990 | Askerneese | 215/11.3 X |
| 5,105,969 | 4/1992 | Lamas | 220/404 |
| 5,183,229 | 2/1993 | Duggan | 215/11.1 X |

Primary Examiner—Allan N. Shoap
Assistant Examiner—Christopher McDonald
Attorney, Agent, or Firm—Ken J. Pedersen; Barbara S. Pedersen

[57] ABSTRACT

Embodiments of a bottle holder are shown and described, each embodiment having an enclosure wall, with an open mouth and an open bottom, into which a disposable liner may be placed. The bottle holder has a lip around the open mouth, over which the open end of the liner is placed and onto which a nipple assembly is secured. The bottle holder also has a bottom support flap that may be pivoted across the open bottom and secured by a latch-means. This bottom support flap forms a temporary floor, which is especially useful for supporting large liquid volume, such as a two-quart calf feeding. Optionally, the bottle holder may be tapered and made stackable.

6 Claims, 3 Drawing Sheets

CALF SUCKER BOTTLE HOLDER

BACKGROUND OF THE INVENTION

1. Technical Field

This invention relates generally to nursing bottles and nursing bottle holders, and, more specifically, to bottle holders for use with disposable plastic liners for feeding calves.

2. Background Art

Rigid plastic bottles with nipples, often called sucker bottles, are used to feed calves or other young animals. These bottles are awkward and time consuming to wash, and they sometimes contribute to animal illness or death because of being unsterile. These bottles are awkward to store and take up significant space because they are not stackable or collapsible.

Smaller rigid plastic or glass bottles are used to feed human infants. These bottles must be sterilized or washed very well, especially in the first months of a baby's life, to prevent illness from contamination of the formula or other liquid. Although smaller than the calf bottles, these bottles are still awkward to use and store, because they are not stackable or collapsible.

In the past few years, bottle holders have become very popular for feeding human infants. These holders are hollow, rigid, plastic cylinders with both ends open, and threads on one end to receive a nipple in a screw-on nipple ring. A thin and flexible plastic liner, commonly called a disposable bottle, either in a four ounce or eight ounce size, is placed inside the hollow bottle holder, and the open end of the liner is opened and stretched over the threaded end of the holder to flap over to the outside of the holder. Liquid is then poured into the liner, and the nipple ring with nipple is screwed on to the holder over the thin disposable liner. The tight fit of the nipple ring holding the nipple against the disposable liner and against the threaded end of the holder seals the system together for use without leaks. The disposable liner and the nipple are the only parts that contact the liquid food. The disposable liner is pre-sterilized and normally used only once and so only the nipple must be sterilized or washed with extreme care. This makes for convenient use of the bottle holder system for travelers, day care providers, or for hurried parents.

What is still needed is a bottle holder that can hold and support large, pre-sterilized, disposable liners that would contain large, heavy volumes such as required for a calf, lamb, or other wild or domestic animal. What is still needed is such a bottle holder that is stackable for easier storage.

DISCLOSURE OF INVENTION

This invention is a bottle holder comprising an enclosure wall having an open bottom and an open mouth, a lip around the open mouth, a bottom support flap, and a latch means. The enclosure wall encloses an interior space in which may be placed a flexible liner. The lip is adapted to removably receive the edge that surrounds the liner opening and to removably and securely receive a nipple assembly for providing a secure and leak-free seal between the liner and the nipple. The bottom support flap pivots to retractably extend across the open bottom of the enclosure wall for providing support for the weight of the liner as it is filled and used. The bottom support flap helps support a heavy volume of liquid to help keep the liner well sealed and in place in the liner holder. The invention may be designed to be stackable, by having the enclosure wall tapered from a larger size near the open bottom to a smaller size near the mouth.

The bottle holder invention has many advantages: it is easy to handle, easy to wash, convenient to use with sterile and/or disposable bottles or liners, and is effective for use with large volume and heavy weight feedings. The bottle holder is simple and inexpensive to make. In addition, the option of designing the bottle holder to be stackable makes it easy to transport and store for use in large livestock operations or zoos.

BEST MODE FOR CARRYING OUT INVENTION

Figure 1:
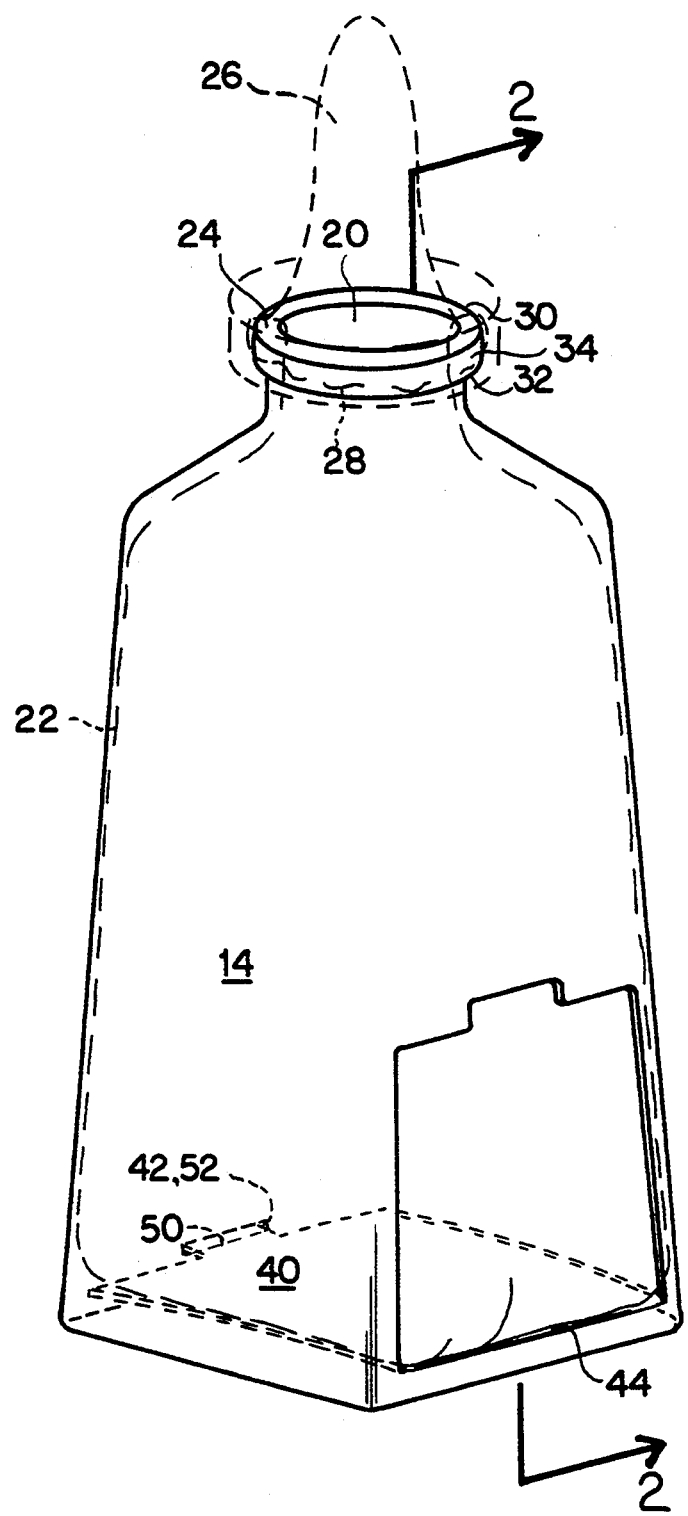
FIG. 1 is a perspective view of one embodiment of the bottle holder invention, with a liner and snap-on nipple in place.
Figure 2:
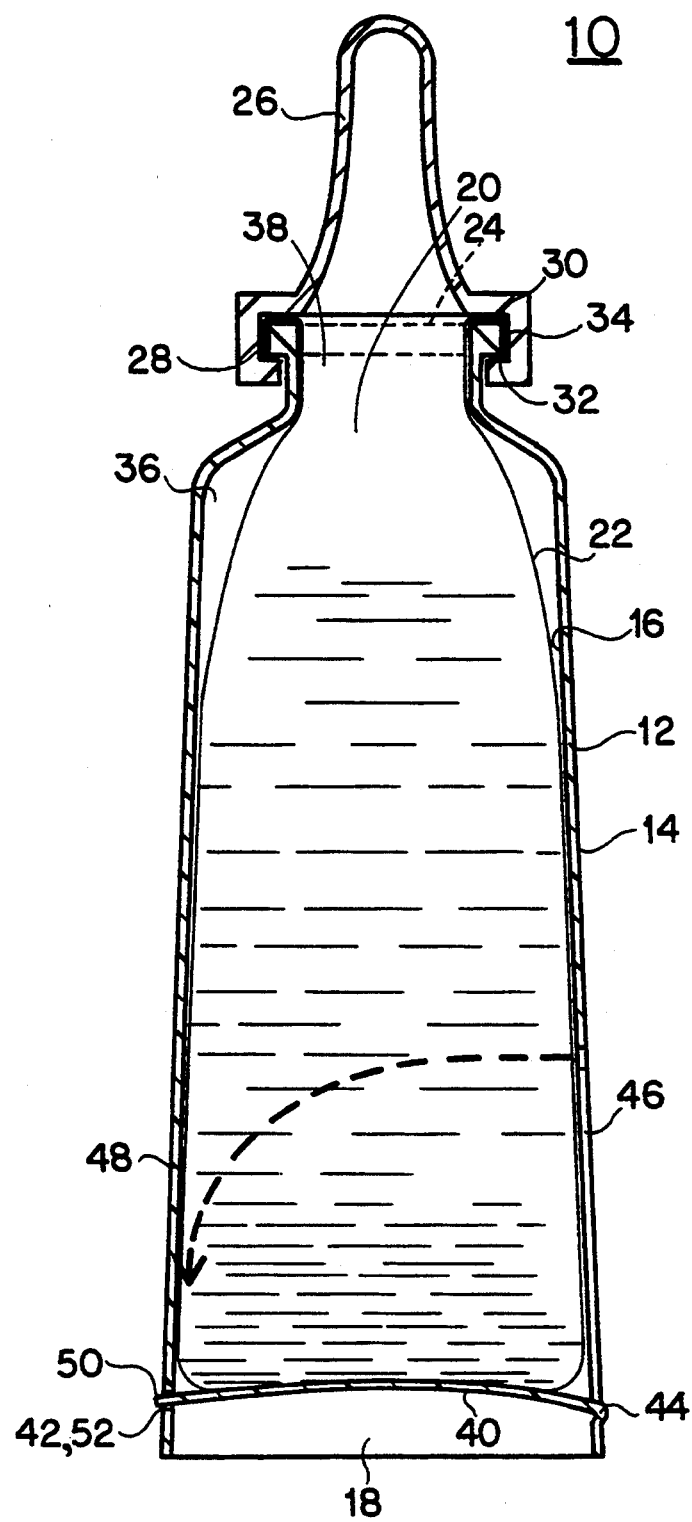
FIG. 2 is a cross-sectional view of the embodiment in FIG. 1, with liner and nipple, cut along a plane indicated by line 2—2.
Figure 3:
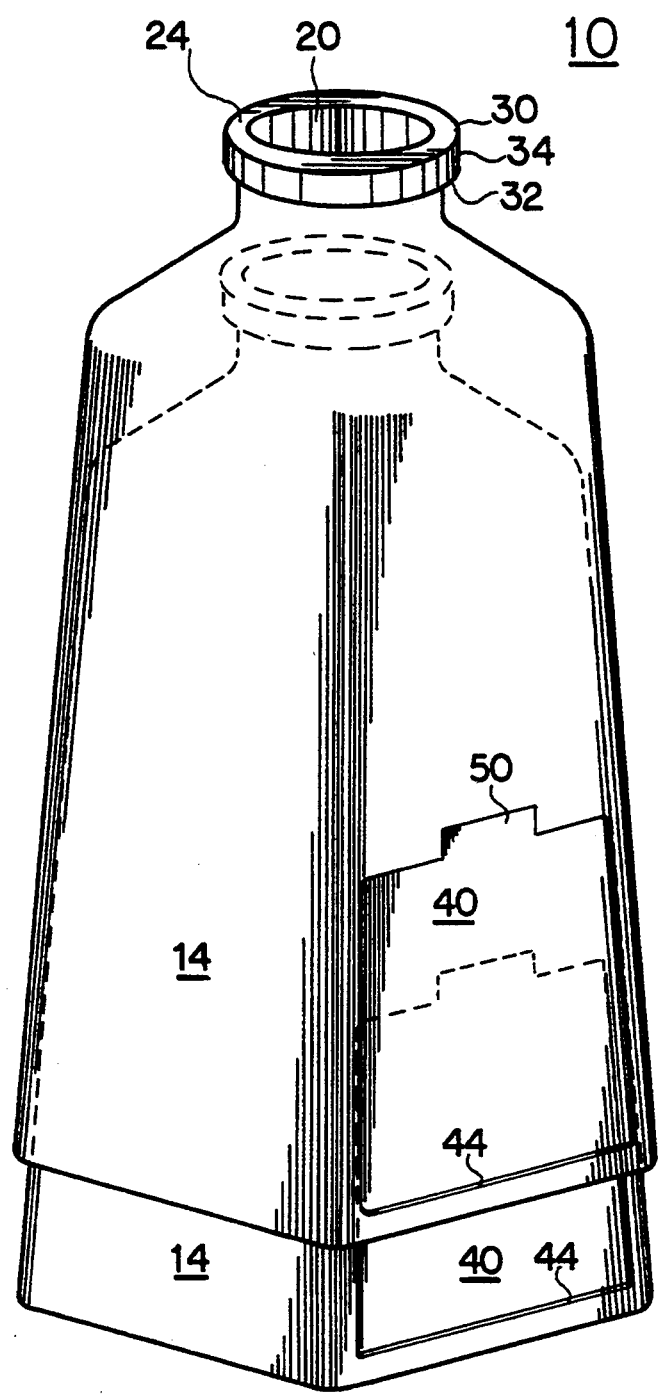
FIG. 3 is a perspective view of two bottle holders, of the embodiment in FIG. 1, stacked together without liners or nipple assemblies.

Referring to FIGS. 1-3, there is shown one, but not the only, embodiment of the bottle holder invention. The bottle holder 10 has an enclosure wall 12 having an exterior surface 14 and an interior surface 16, and having two openings, an open bottom 18 and an open mouth 20 that is generally, but not necessarily exactly, opposite the open bottom 18. Optionally, there may be other holes or openings in the enclosure wall 12, for example, slots to allow warm water from a water bath to circulate into the bottle holder 10 and around the flexible liner 22.

Attached to and extending from the enclosure wall 12 around the open mouth 20 is a lip 24 that aids in securing a liner 22 into the holder 10 and in securing a nipple assembly 26 onto the bottle holder 10. A nipple assembly 26 may be just a nipple or a nipple with other parts, such as a ring, gasket, or a flange clamp. The lip 24 may be of various designs that cooperate with various designs of nipple assemblies 26, to hold the liner edge 28 securely in between the lip 24 and the nipple assembly 26 and to make a leak-free seal between the nipple assembly 26 and the liner 22. Preferably, designs of the lip 24 and the nipple assembly 26 are such that the liquid contacts only the inside of the liner and the nipple, in order to minimize the chance of unclean parts contacting the liquid. The lip 24 may be designed, for example, to cooperate with a snap-on nipple, by having an upper, outer, square shoulder 30 and a lower, outer square shoulder 32 that would fit securely into a female version of the same shape on the inside of a nipple. Alternatively, a lip 24 could have threads on the outer surface 34 of the lip 24 to cooperate with threads on a threaded nipple or threaded nipple ring.

Either the open bottom 18 or open mouth 20 may be used for insertion of a disposeable liner 22 or other liner into the interior space 36 defined and generally surrounded by the interior surface 16 of the enclosure wall 12. The edge 28 around the liner opening 38 may be draped or stretched up through the open mouth 20 and over the lip 24 to hang down along the lip outer surface 34. The liner edge 28 may be manually held in place over the lip 24 while the liner 22 is filled with liquid and the nipple assembly 26 is attached, or preferably, the edge 28 fits tightly enough over the lip 24 that it stays in place by itself during the filling and attachment.

The bottle holder 10 further comprises a bottom support flap 40 which may be used to support the liner 22 as it is being filled and used. This is especially important when a large liquid volume is needed, such as the common two quart feeding needed for a calf. Either before the liner 22 is inserted into the bottle holder 10 or after the liner 22 is inserted through the open bottom 18, the bottom support flap 40 is placed across the open bottom 18 and held in place with a latch means 42. After the liner 22 is filled with liquid, the bottom support flap 40 supports the liner 22 and helps prevent the heavy liquid from pulling the liner edge 28 away from the lip 24 and nipple assembly 26, which could cause a leak and/or make sucking liquid out of the liner inefficient or impossible. The bottom support flap 40 can be unlatched and swung away from the open bottom 18 so that someone may reach into the bottle holder 10 to remove a liner 22 or to clean the interior sub, face 16 of the bottle holder 10, or, as explained later in this description, so that several bottle holders 10 may be stacked.

The bottom support flap 40 is preferably a section cut, on all but a pivot end 44, out from a first opposing wall section 46 of the enclosure wall 12. The bottom support flap 40 is then bent or pivoted into the interior space 36 toward the second opposing wall section 48. The extension end 50 of the bottom support flap 40 preferably snaps into a slot 52 cut in the second opposing wall section 48 and this serves as the latch means 42 to hold the bottom support flap 40 in place. Preferably, the enclosure wall 12 is made of a bendable and resilient plastic that allows the pivotal end 44 to repeatedly bend and the extension end 50 to repeatedly snap in and out of the slot 52 without breakage.

Alternatively, the bottom support flap 40 and latch means 42 may be of a variety of designs, as long as the bottom support flap 40 in attached at the pivot end 44 to the enclosure wall 12 near the open bottom 18 and the extension end 50 retractably reaches across the open bottom 18 so that the bottom support flap 40 acts like a temporary floor for the bottle holder 10. For example, the bottom support flap 40 and latch means 42 might be a cloth strap snapped onto the enclosure wall 12, or a panel tied through small holes in the enclosure wall 12.

Preferably, but not necessarily, the bottle holder 10 is designed to be stackable, to make handling, shipping, and storage easier and more space efficient. The enclosure wall 12 may be tapered from a larger interior surface 16 perimeter near the open bottom 18 to a smaller exterior surface 14 perimeter near the open mouth 20. This, plus being able to move and retract the bottom support flap 40 away from the open bottom 18, enable a user to nest one bottle holder 10 into another bottle holder 10, as shown in FIG. 3.

The bottle holder invention 10 may be made a variety of sizes, but, as explained above, it is particularly useful for large feedings in the range of one quart and larger. The bottle holder 10 may be a variety of shapes, but is preferably generally cylindrical near the open mouth 20 to receive the typical cylindrical disposable bottle 22. The bottle holder 10 may be a variety of shapes near the open bottom 18, such as round, oval, or square as in the embodiment in FIGS. 1–3. Optionally, the bottle holder 10 may have a hole, tab, or other means for allowing the bottle holder 10 to be hung in position for feeding without someone having to hold it for the animal.

While there is shown and described the present preferred embodiment of the invention, it is to be distinctly understood that this invention is not limited thereto but may be variously embodied to practice within the scope of the following claims.

I claim:

1. A bottle holder for use with a nipple assembly and a flexible liner having an opening for receiving and dispensing liquid and having an edge surrounding the opening, the bottle holder comprising:

an enclosure wall comprising an exterior surface, an interior surface surrounding and defining an interior space for receiving the liner, first and second opposing wall sections, an open bottom, and an open mouth opposing the open bottom, a lip integrally extending from the enclosure wall around the open mouth, the lip adapted for removably receiving the edge of the liner to hold open the opening of the liner and for cooperating with the nipple assembly to form a leak-free seal between the nipple assembly and the liner, a bottom support flap cut from the first opposing wall section, the bottom support flap having a pivot end and an opposing extension end, the pivot end pivotally attached to the first opposing wall section near the open bottom and the extension end retractably extending across the open bottom toward the second opposing wall section, the bottom support flap being for supporting the liner when filled with liquid and for pivoting away from the open bottom for allowing access to the interior space, and a latch means for detachably holding the bottom support flap across the open bottom of the bottle holder, the latch means comprising a slot cut in the second opposing wall section of the enclosure wall for securely and detachably receiving the extension end of the bottom support flap.

2. A bottle holder as set forth in claim 1, wherein the enclosure wall is tapered from the open bottom to the open mouth to make the interior surface perimeter near the open bottom larger than the exterior surface perimeter near the open mouth, for adapting the bottle holder to be stackable onto other similar bottle holders.

3. A bottle holder for use with a nipple assembly and a flexible liner having an opening for receiving and dispensing liquid and having an edge surrounding the opening, the bottle holder comprising:

an enclosure wall comprising an exterior surface, an interior surface surrounding and defining an interior space for receiving the liner, first and second opposing wall sections, an open bottom, and an open mouth opposing the open bottom, a lip integrally extending from the enclosure wall around the open mouth, the lip adapted for removably receiving the edge of the liner to hold open the opening of the liner and the lip comprising threads for cooperating with a threaded-style nipple assembly to form a leak-free seal between the nipple assembly and the liner, a bottom support flap having a pivot end and an opposing extension end, the pivot end pivotally attached to the first opposing wall section near the open bottom and the extension end retractably extending across the open bottom toward the second opposing wall section, the bottom support flap being for supporting the liner when filled with liquid and for pivoting away from the open bottom for allowing access to the interior space, and a latch means for detachably holding the bottom support flap across the open bottom of the bottle holder.

4. A bottle holder as set forth in claim 3, wherein the enclosure wall is tapered from the open bottom to the open mouth to make the interior surface perimeter near the open bottom larger than the exterior surface perimeter near the open mouth, for adapting the bottle holder to be stackable onto other similar bottle holders.

5. A bottle holder for use with a nipple assembly and a flexible liner having an opening for receiving arid dispensing liquid and having an edge surrounding the opening, the bottle holder comprising:

an enclosure wall comprising an exterior surface, an interior surface surrounding and defining an interior space for receiving the liner, first and second opposing wall sections, an open bottom, and an open mouth opposing the open bottom, a lip integrally extending from the enclosure wall around the open mouth, the lip adapted for removably receiving the edge of the liner to hold open the opening of the liner and the lip comprising an upper, outer substantially square shoulder and a lower, outer substantially square shoulder for cooperating with a snap-on style nipple assembly to form a leak-free seal between the nipple assembly and the liner, a bottom support flap having a pivot end and an opposing extension end, the pivot end pivotally attached to the first opposing wall section near the open bottom and the extension end retractably extending across the open bottom toward the second opposing wall section, the bottom support flap being for supporting the liner when filled with liquid and for pivoting away from the open bottom for allowing access to the inter,or space, and a latch means for detachably holding the bottom support flap across the open bottom of the bottle holder.

6. A bottle holder as set forth in claim 5, wherein the enclosure wall is tapered from the open bottom to the open mouth to make the interior surface perimeter near the open bottom larger than the exterior surface perimeter near the open mouth, for adapting the bottle holder to be stackable onto other similar bottle holders.

* * * * *